(12) United States Patent
Pascal et al.

(10) Patent No.: US 11,913,403 B2
(45) Date of Patent: Feb. 27, 2024

(54) DOOR THRUST REVERSER COMPRISING A DEFLECTOR FOR REDIRECTING AN AIR FLOW IN THE UPSTREAM DIRECTION

(71) Applicant: SAFRAN NACELLES, Gonfreville-l'orcher (FR)

(72) Inventors: Sebastien Laurent Marie Pascal, Moissy-Cramayel (FR); Laurent Georges Valleroy, Moissy-Cramayel (FR); Paul Ferrey, Moissy-Cramayel (FR)

(73) Assignee: SAFRAN NACELLES, Gonfreville-l'orcher (FR)

( * ) Notice: Subject to any disclaimer, the term of this patent is extended or adjusted under 35 U.S.C. 154(b) by 0 days.

(21) Appl. No.: 17/758,037

(22) PCT Filed: Dec. 18, 2020

(86) PCT No.: PCT/FR2020/052555
§ 371 (c)(1),
(2) Date: Jun. 27, 2022

(87) PCT Pub. No.: WO2021/136903
PCT Pub. Date: Jul. 8, 2021

(65) Prior Publication Data
US 2023/0046876 A1 Feb. 16, 2023

(30) Foreign Application Priority Data
Jan. 2, 2020 (FR) ........................ 2000014

(51) Int. Cl.
*F02K 1/60* (2006.01)
*F02K 1/32* (2006.01)
*F02K 1/70* (2006.01)

(52) U.S. Cl.
CPC . *F02K 1/32* (2013.01); *F02K 1/70* (2013.01)

(58) Field of Classification Search
CPC ... F02K 1/54; F02K 1/563; F02K 1/62; F02K 1/625; F02K 1/64; F02K 1/70; F02K 1/72
See application file for complete search history.

(56) References Cited

U.S. PATENT DOCUMENTS 3,893,626 A   7/1975  Leibach et al.
5,396,762 A * 3/1995  Standish ............... F02K 1/563
                                            244/110 B (Continued)

FOREIGN PATENT DOCUMENTS

FR      2 706 947 A1   12/1994

OTHER PUBLICATIONS

International Search Report dated Apr. 14, 2021 in PCT/FR2020/052555 filed on Dec. 18, 2020 (2 pages).

(Continued)

*Primary Examiner* — Gerald L Sung
(74) *Attorney, Agent, or Firm* — Oblon, McClelland, Maier & Neustadt, L.L.P.

(57) ABSTRACT

A thrust reverser including a stationary structure, a lower door and an upper door. This reverser includes at least one deflector configured to be able to redirect forward from the stationary structure a portion of fluid exiting the reverser according to a trajectory oriented towards a lateral opening extending between the stationary structure and the upper door. Such a deflector makes it possible to improve the control of the air current lines acting on a tail unit and in particular on a control surface of an aircraft equipped with such a reverser when the latter is in thrust reversal configuration, thereby making it possible to improve the controllability of this aircraft.

7 Claims, 6 Drawing Sheets

(56) References Cited

U.S. PATENT DOCUMENTS

| | | | |
|---|---|---|---|
| 5,473,886 A | 12/1995 | Lebrun et al. | |
| 2009/0126342 A1 | 5/2009 | Lair | |
| 2013/0056554 A1* | 3/2013 | Guillois | F02K 1/763 239/265.19 |
| 2015/0113944 A1* | 4/2015 | Pascal | B64D 33/04 239/265.19 |
| 2017/0057166 A1* | 3/2017 | Soria | B29C 64/118 |
| 2017/0292473 A1* | 10/2017 | Stretton | F02K 1/763 |
| 2023/0039569 A1* | 2/2023 | Pascal | F02K 1/62 |

OTHER PUBLICATIONS

Preliminary French Search Report dated Sep. 3, 2020 in French Application 2000014 filed on Jan. 2, 2020 (2 pages with English Translation of Categories of Cited Documents).

* cited by examiner

DOOR THRUST REVERSER COMPRISING A DEFLECTOR FOR REDIRECTING AN AIR FLOW IN THE UPSTREAM DIRECTION

TECHNICAL FIELD

The invention relates to the field of thrust reversers for aircraft propulsion assembly nacelle, and more specifically to the field of door reversers.

In a non-limiting manner, the invention is of particular interest when such a reverser equips a propulsion assembly mounted in the vicinity of a tail, that is to say generally in the rear portion of the fuselage of an aircraft.

PRIOR ART

FIG. 1 shows a conventional business aircraft 1 extending along a longitudinal axis A1.

This aircraft 1 comprises a fuselage 2, two propulsion assemblies 3 mounted in the rear portion of the fuselage 2 (only one propulsion assembly being visible in FIG. 1), a horizontal tail 4 and a vertical tail 5. The vertical tail 5 comprises a fixed portion 6, also called tailfin, and a movable portion 7, also called rudder or control surface. The tailfin 6 is intended to stabilise the aircraft 1 around a yaw axis A2, in particular in order to keep the longitudinal axis A1 parallel to the axis of the runway during the landing phase in the event of a crosswind (see below). The control surface 7 is intended to control the moment of the aircraft 1 around the yaw axis A2, in particular to be able to maintain the longitudinal axis A1 parallel to the axis of the runway during the landing phase.

Each of the propulsion assemblies 3 comprises a thrust reverser having an upper door 8 and a lower door 9. In FIG. 1, the propulsion assemblies 3 are in a direct thrust configuration wherein the doors 8 and 9 are closed so as to close respective reversal openings (not shown in this figure).

FIG. 2 schematically shows the two propulsion assemblies (respectively referenced 3A and 3B) as well as the vertical tail 5 with respect to said longitudinal axis A1 and to a relative wind A3. The relative wind A3 is the wind generated by the sum of the displacement of the aircraft 1 and the wind. In FIG. 2, the propulsion assemblies 3A and 3B are in a thrust reversal configuration wherein said doors (not shown in this figure) are open so as to release the corresponding reversal openings, namely an upper reversal opening 10A associated with the upper door of the reverser of the propulsion assembly 3A and an upper reversal opening 10B associated with the upper door of the reverser of the propulsion assembly 3B.

In a manner known per se, the doors of the propulsion assemblies 3A and 3B in thrust reversal configuration are configured to redirect in an upstream direction A4 portion of the air exiting the propulsion assemblies 3A and 3B through the reversal openings 10A/10B.

FIG. 2 illustrates a crosswind landing situation, causing the aircraft 1 to move around the yaw axis A2 so that its longitudinal axis A1 forms an angle B1 with the relative wind direction A3.

Under these conditions, the vertical tail 5 is likely to be subjected to asymmetric air currents, taking into account in particular the respective trajectories of the air flows exiting the propulsion assemblies 3A and 3B through the upper reversal openings 10A and 10B.

Indeed, a portion of the air exiting the propulsion assembly 3B, through the upper reversal opening 10B, typically flows along a trajectory 11B passing through a region C1 extending along one of the faces of the vertical tail 5 located on the side of this propulsion assembly 3B. A portion of the air exiting the propulsion assembly 3A, through the upper reversal opening 10A, typically flows along a trajectory 11A bypassing the tailfin 6 and also crossing the region C1. On the side of the propulsion assembly 3A, a region C2 extending along the other face of the vertical tail 5 thus finds itself undersupplied with air.

The lack of air supply to the tailfin 6 at the region C2 leads to a loss of stability of the aircraft 1.

In addition, the control surface 7 thus emptied of wind at the region C2 has a reduced effectiveness likely to lead to a loss of controllability of the aircraft 1 and potentially a runway excursion.

DISCLOSURE OF THE INVENTION

A purpose of the invention is to provide a door reverser capable of improving the stability and controllability of an aircraft when the doors are open in the landing phase, in particular in crosswinds.

More generally, the invention aims at providing a door reverser allowing to better control the air flows resulting from the opening of the doors.

To this end, the object of the invention is a thrust reverser for an aircraft propulsion assembly, this reverser comprising a fixed structure and at least one door movable between:

- a closed position wherein it delimits with the fixed structure a flow conduit, the flow conduit comprising an ejection outlet delimited at least partly by a rear end of the fixed structure, the door in the closed position being configured to be able to guide a fluid flowing in the conduit to its ejection outlet in order to generate a thrust, and
- an open position wherein the door releases a reversal opening so as to be able to evacuate from the flow conduit a portion of said fluid, via this reversal opening, and redirect a first portion of the fluid thus evacuated to a front end of the fixed structure in order to generate counter-thrust, the opening of the door forming at least one lateral opening extending between the fixed structure and a lateral end of the door.

According to the invention, only on one side of a first median longitudinal plane of the reverser, one of the door and the fixed structure, or each of the door and the fixed structure comprises at least one deflector configured to be able to redirect a second portion of the fluid forward of the fixed structure, this second portion of the fluid exiting the flow conduit along a trajectory oriented towards said lateral opening.

In other words, each deflector which is connected to the door or the fixed structure and which is configured to be able to redirect said second portion of the fluid forward of the fixed structure, is located on the same side of the first median longitudinal plane of the reverser.

Thus, when the door and/or the fixed structure comprise several deflectors, the latter are all located on the same side of the first median longitudinal plane.

More generally, the reverser is consequently devoid of such a deflector on the other side of the first median longitudinal plane.

Such a deflector allows to prevent the portion of fluid thus redirected from supercharging one side of the vertical tail and in particular of the control surface.

The invention thus allows to improve the stability and the controllability of the aircraft.

The deflector according to the invention more generally allows to better control the air flows resulting from the opening of said door.

In one embodiment, the deflector may comprise one or more channels for redirecting said second portion of fluid.

According to a first variant embodiment, the structure(s), among the door and the fixed structure, comprising said deflector can comprise one or more recesses forming said channel(s).

According to a second variant embodiment, the deflector can be an insert.

The reverser can comprise both one or more deflectors according to the first variant and one or more deflectors according to the second variant.

In one embodiment, the deflector may extend radially between an internal surface and an external surface of the door, at least when the door is closed.

Such a configuration of the deflector allows to limit its impact on the fluid flows in the duct and outside the reverser in the direct thrust configuration. This prevents an increase in drag.

Preferably, when the deflector comprises said redirection channel(s), the deflector can be configured so that an inlet of said channel(s) is closed off by the door and/or by the fixed structure when the door is closed.

In one embodiment, the deflector can be configured to redirect said second portion of the fluid so that, at the outlet of the deflector, at least a fraction of the fluid thus redirected is oriented in a direction forming with a central longitudinal axis of the reverser, in a median horizontal plane passing through this central longitudinal axis, an angle comprised between 15° and 75°, preferably comprised between 35° and 55°, preferably equal to 45°, when the door is in the open position.

The invention also relates to a nacelle for an aircraft propulsion assembly, this nacelle comprising a reverser as described above.

The invention also relates to a propulsion assembly for an aircraft, this propulsion assembly comprising such a nacelle.

Finally, the invention also relates to an aircraft comprising such a propulsion assembly.

In one embodiment, the propulsion assembly can be mounted on a fuselage of the aircraft, the deflector and the fuselage being located on the same side of said first median longitudinal plane of the reverser.

Preferably, a tail of the aircraft and said door of the reverser can be located on the same side of a second median longitudinal plane of the reverser, this second median longitudinal plane being perpendicular to said first median longitudinal plane.

Other advantages and features of the invention will appear upon reading the detailed, non-limiting description which follows.

BRIEF DESCRIPTION OF THE DRAWINGS

The following detailed description refers to the appended drawings wherein.

DETAILED DESCRIPTION OF EMBODIMENTS

Figure 1:
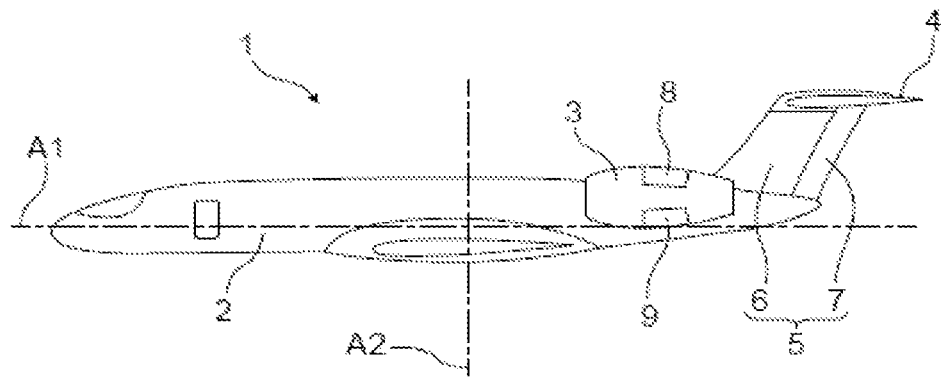
FIG. 1 is a schematic view, already described above, of an aircraft of the prior art, this aircraft comprising propulsion assemblies each equipped with a door thrust reverser.
Figure 3:
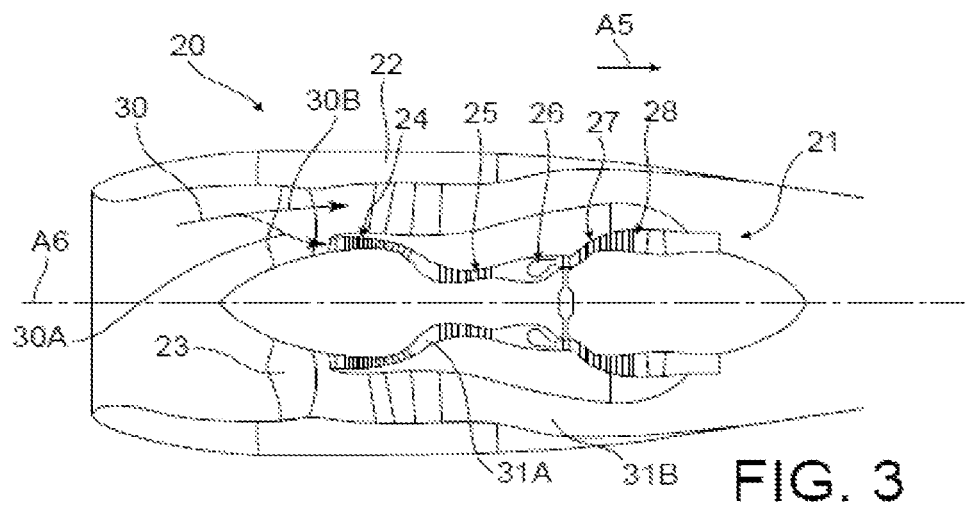
FIG. 3 is a schematic view in axial section of an aircraft propulsion assembly.

FIG. 3 shows a propulsion assembly 20 intended to be mounted on an aircraft such as the aircraft 1 of FIG. 1.

In the present description, the terms "upstream", "downstream", "front" and "rear" are defined with respect to a direction A5 of air flow around the propulsion assembly 20 when the latter generates thrust, that is to say a direction A5 opposite to the direction of movement of the aircraft that it propels.

In a manner known per se, the propulsion assembly 20 comprises a turbomachine 21 shrouded by a nacelle 22. In this example, the turbomachine 21 is a two-spool and bypass turbojet engine.

The turbojet engine 21 has a central longitudinal axis A6 around which its various components extend, in this case, from the front to the rear of the turbojet engine 21, a fan 23, a low pressure compressor 24, a high pressure compressor 25, a combustion chamber 26, a high pressure turbine 27 and a low pressure turbine 28. The compressors 24 and 25, the combustion chamber 26 and the turbines 27 and 28 form a gas generator.

During operation of the turbojet engine 21, an air flow 30 enters the nacelle 22 via an air inlet upstream of the propulsion assembly 20, crosses the fan 23 then divides into a central primary flow 30A and a secondary flow 30B. The primary flow 30A flows in a primary gas flow path 31A passing through the gas generator. The secondary flow 30B flows in a secondary flow path 31B surrounding the gas generator and delimited radially outwards by the nacelle 22.

Figure 4:
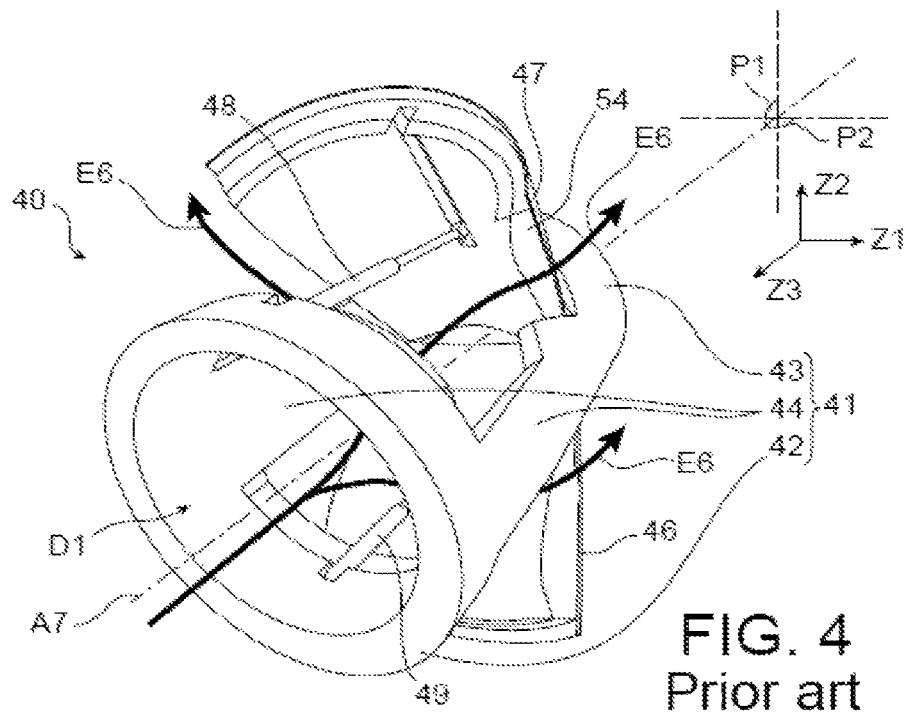
FIG. 4 is a schematic perspective view of a thrust reverser of the prior art, this reverser comprising doors in the open position corresponding to a thrust reversal configuration.

The invention relates more specifically to a thrust reverser 40 of the type illustrated in FIG. 4. In this figure, the reverser 40 is a reverser of the prior art in the sense that it does not comprise any lateral flow redirection deflector (see further below). The purpose of FIG. 4 is to illustrate more specifically the structure of this reverser 40 and certain typical trajectories of the fluid exiting this reverser 40 when the latter is in a thrust reversal configuration.

In general, the function of the reverser 40 is to reverse a portion of the thrust generated by the propulsion assembly 20 in order to brake the aircraft during its landing.

Of course, the reverser 40 can equip a propulsion assembly different from that of FIG. 3 without departing from the scope of the invention.

With reference to FIG. 4, the reverser 40 comprises on the one hand a fixed structure 41 extending along a central longitudinal axis A7.

The fixed structure 41 comprises in this example a front frame 42, a rear section 43 and two beams 44 connecting the front frame 42 and the rear section 43 to each other.

The front frame 42 has an annular shape configured to connect the reverser 40 to the nacelle 22, according to any conventional assembly technique.

In this example, the rear section 43 has an annular shape defining an ejection shroud. This ejection shroud 43 defines a rear end of both the reverser 40, the nacelle 22 and the propulsion assembly 20.

When the reverser 40 is mounted on the propulsion assembly 20, the central longitudinal axis A7 of the reverser 40 and the central longitudinal axis A6 of the propulsion assembly 20 coincide.

The front frame 42, the rear section 43 and the beams 44 delimit, radially outwards, a flow conduit D1 for a fluid coming from a portion of the propulsion assembly 20 located upstream of the reverser 40.

More specifically, the fluid capable of flowing in the conduit D1 is in this example made up of a mixture of gas exiting the primary flow path 31A and air coming from the secondary flow path 31B, that is to say of a mixture of the primary 30A and secondary 30B flow paths.

The flow conduit D1 comprises an inlet delimited by the front frame 42 and an ejection outlet delimited by the rear section 43.

In order to be able to perform thrust reversal, the fixed structure 41 comprises in this example two reversal openings in the form of radial openings.

Each of these reversal openings is delimited, longitudinally, by the front frame 42 and the rear section 43 and, radially, by the beams 44.

The reverser 40 of FIG. 4 also comprises a movable structure in the shape of two pivoting doors 46 and 47.

The doors 46 and 47 are respectively called lower door and upper door, with reference to their relative positioning with respect to the vertical when the reverser 40 is connected to an aircraft in flight configuration.

Figure 5:
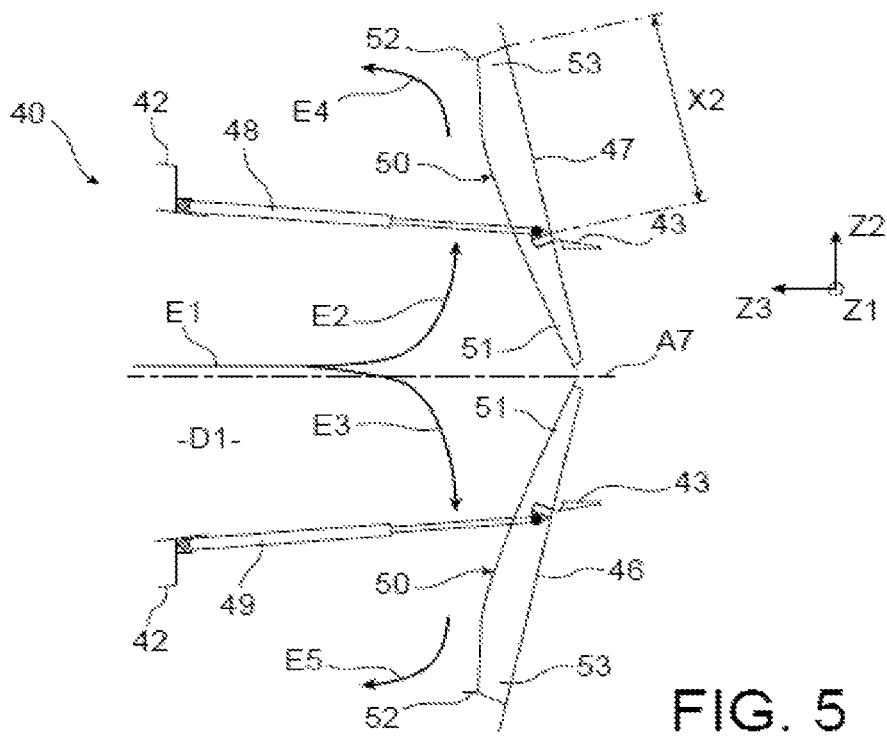
FIG. 5 is a schematic view in axial section of the reverser of FIG. 4, in thrust reversal configuration.
Figure 6:
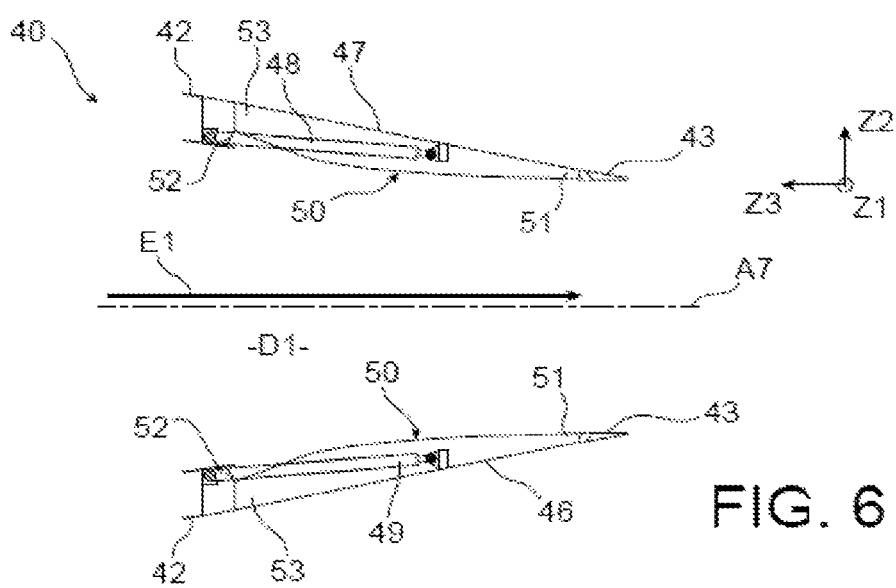
FIG. 6 is a schematic view in axial section of the reverser of FIG. 4, in the direct thrust configuration, the doors being in the closed position.

Each of the doors 46 and 47 is movable with respect to the fixed structure 41, around a respective axis of rotation (not shown), between an open position, illustrated in FIGS. 4 and 5, and a closed position illustrated in FIG. 6.

To modify the position of the doors 46 and 47, the reverser 40 comprises two cylinders 48 and 49 which are each connected on the one hand to the front frame 42 of the fixed structure 41 and on the other hand to a respective one of the doors 46 and 47.

With reference to FIG. 6, wherein the doors 46 and 47 are in the closed position, each of the doors 46 and 47 closes off a respective one of the reversal openings so as to delimit, in continuity with the fixed structure 41, the flow conduit D1.

In the closed position, the doors 46 and 47 allow to guide to the ejection outlet a fluid E1 entering the conduit D1 at the front frame 42 and flowing in the conduit D1 in a direction generally parallel to the central longitudinal axis A7. As indicated above, the fluid flow E1 comprises in this example a mixture of the primary 30A and secondary 30B flows generated by the operation of the turbojet engine 21.

In this configuration of reverser 40 wherein the doors 46 and 47 are in the closed position, the propulsion assembly 20 can generate direct thrust. This configuration of the reverser 40 is called direct thrust, or else "direct jet".

With reference to FIG. 5, wherein the doors 46 and 47 are in the open position, the doors 46 and 47 release the reversal openings of the fixed structure 41.

This open position allows to evacuate from the flow conduit D1, via the reversal openings, portions E2 and E3 of the fluid E1 flowing in the conduit D1. It also allows to redirect at least a portion E4 and E5 of the fluid thus evacuated upstream, that is to say in particular towards the front frame 42 of the fixed structure 41 and more generally towards the front of the propulsion assembly 20 and of the aircraft 1. The fluid thus redirected in the upstream direction generates a counter-thrust.

To direct the fluid in the upstream direction, the doors 46 and 47 each comprise an internal wall 50 having a proximal end 51 configured to extend radially through the flow conduit D1, so as to prevent all or most of the fluid E1 flowing in the conduit D1 to continue its trajectory to the ejection outlet. The orientation of the internal wall 50 is such that the fluid E1 thus blocked continues its trajectory by crossing the reversal openings and by having at least one component oriented upstream.

In a manner known per se, it is possible to maximise this component and improve thrust reversal performance by placing a spoiler 52 at a distal end 53 of the internal wall 50 of each of the doors 46 and 47.

When the doors 46 and 47 are in the open position, the reverser 40 is in a configuration called thrust reversal configuration, also called "reverse jet".

In the present description, the expression "open position" designates a position of maximum opening as shown in FIGS. 4 and 5, it being understood that the doors 46 and 47 temporarily occupy intermediate positions during changes in the configuration of the reverser 40.

In practice, the reverser 40 of FIG. 4 does not allow to redirect all the fluid E1 in the upstream direction when the doors 46 and 47 are open.

In particular, a fraction E6 of the fluid exiting the flow conduit D1 through the reversal openings tends to continue its trajectory laterally, in the downstream direction, crossing lateral openings respectively defined between lateral ends 54 of the doors 46 and 47 and the beams 44 of the fixed structure 41 when the doors 46 and 47 are open (see FIG. 4).

Figure 2:
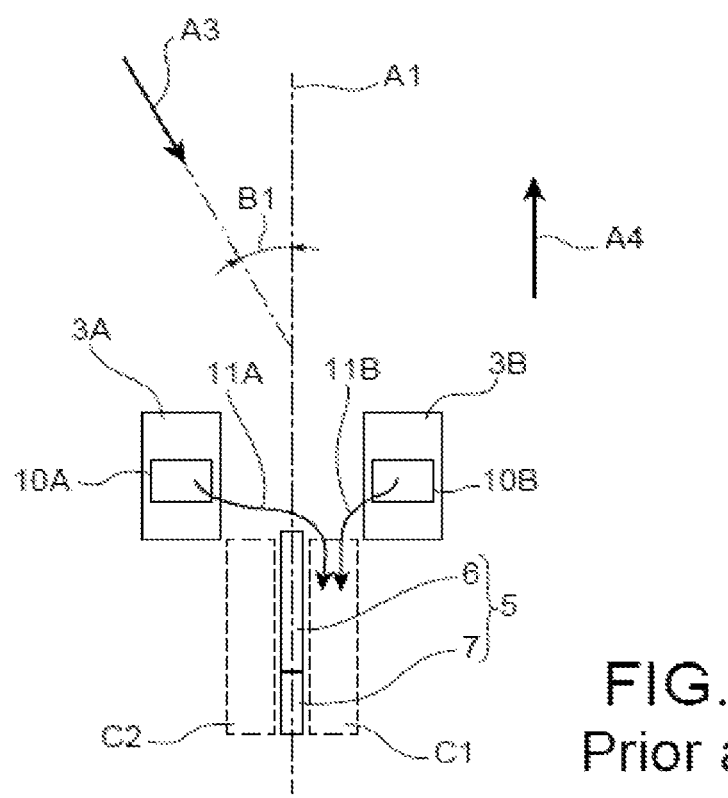
FIG. 2 is a schematic view, already described above, of portions of the aircraft of FIG. 1 in the crosswind landing phase, the reversers being in a thrust reversal configuration.

This fraction of fluid E6 is likely to reduce the stability and controllability of the aircraft for the reasons set out above with reference to FIG. 2.

To overcome this disadvantage, the reverser 40 comprises at least one deflector 60 as described below, in order to control the orientation of a portion of this fraction of fluid E6.

FIGS. 4-6 comprise a reference frame Z1, Z2 and Z3 respectively defining lateral, vertical and longitudinal directions.

A first median longitudinal plane P1 and a second median longitudinal plane P2 are defined with respect to this reference frame. In this example, the median longitudinal plane P1 is a vertical plane parallel to the directions Z2 and Z3 and passing through the central longitudinal axis A7 of the reverser 40 and through the cylinders 48 and 49. The median longitudinal plane P2 is a horizontal plane parallel to the directions Z1 and Z3 which also passes through the central longitudinal axis A7 and which is perpendicular to the vertical plane P1.

In each of the following examples, it is considered that the reverser 40 equips a propulsion assembly 20 connected to the aircraft 1 so that the deflector 60 of the reverser 40 and the fuselage 2 of the aircraft 1 are located on the same side of the vertical plane P1 and that the deflector 60 of the reverser 40 and the tail 5 of the aircraft 1 are located on the same side of the horizontal plane P2.

Figure 7:
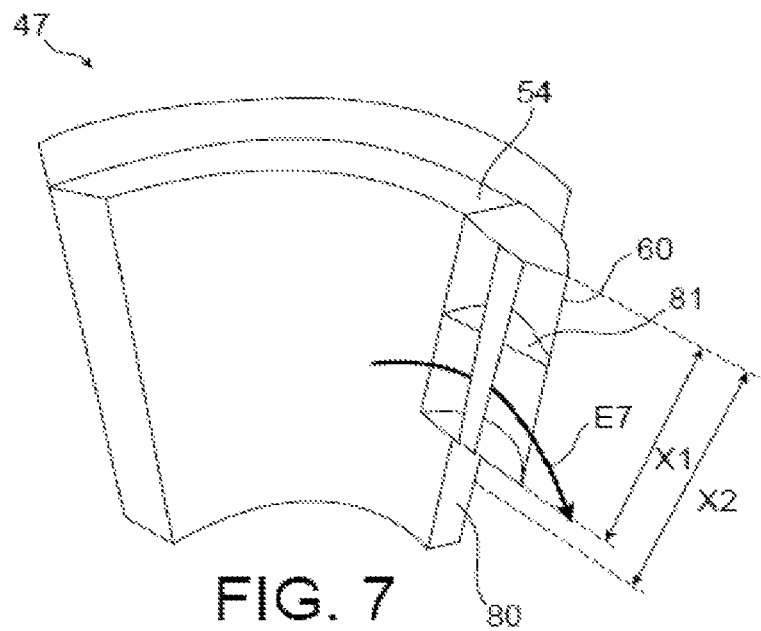
FIG. 7 is a schematic perspective view of a reverser door comprising a deflector according to a first embodiment of the invention.

In the embodiment of FIG. 7 and subsequent, the reverser 40 has a general structure similar to that of the reverser of FIG. 4.

FIG. 7 shows in isolation the upper door 47 of this reverser 40 as well as a deflector 60 arranged on a flank 80 of the door 47 located at one of its lateral ends 54. This lateral end 54 is called internal end with reference to its relative position within a preferred architecture of the invention.

In this preferred architecture, the reverser 40 equips a propulsion assembly such as the propulsion assembly 20 of FIG. 3 itself mounted on the fuselage 2 of an aircraft, such as the aircraft 1 of FIG. 1, so that said internal lateral end 54 is located on the same side as the fuselage 2 with respect to said vertical plane P1.

Figure 11:
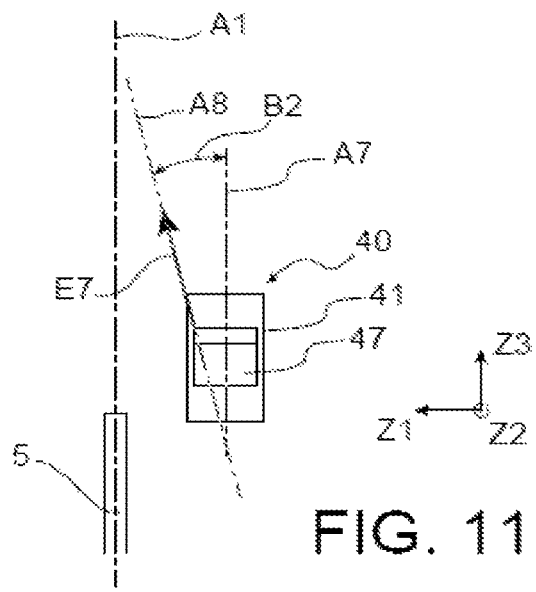
FIG. 11 is a schematic view of a reverser in accordance with the invention in thrust reversal configuration and of a tail of an aircraft equipped with this reverser.

In such a context, the deflector 60 is configured to redirect in the upstream direction, that is to say opposite the tail 5 of this aircraft 1, a portion E7 of the fluid exiting the conduit D1 when the upper door 47 is in the open position (see FIGS. 7 and 11).

The fluid E7 thus redirected in the upstream direction is deflected from its natural trajectory E6 illustrated in FIG. 4, which allows to reduce the phenomenon of asymmetric air supply to the tail 5 and in particular to the control surface 7, in particular in crosswinds.

Figure 8:
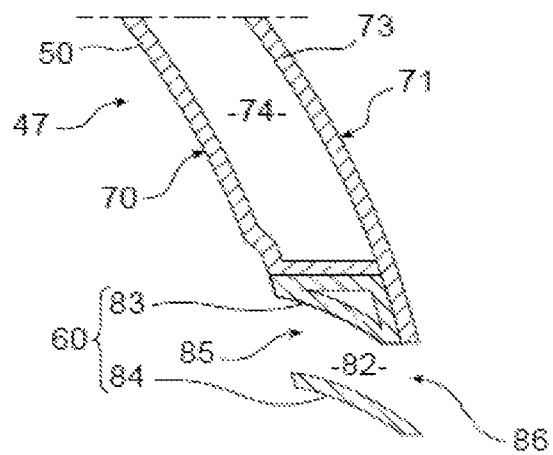
FIG. 8 is a schematic sectional view of the door of FIG. 7.
Figure 9:
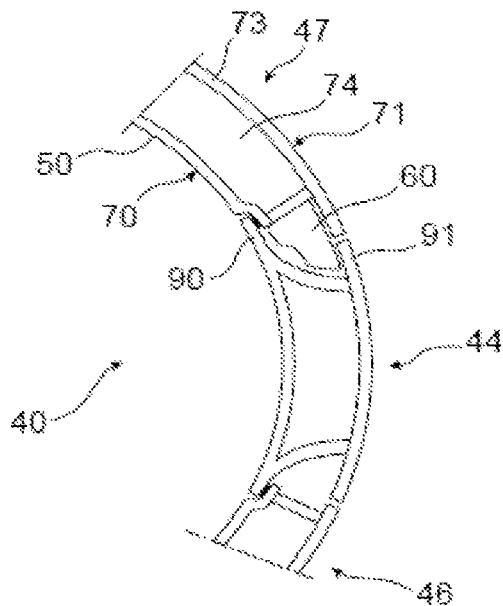
FIG. 9 is a schematic sectional view of a reverser equipped with the door of FIG. 7, the reverser being in the direct thrust configuration.

In the example of FIGS. 7 to 9, the deflector 60 comprises a single redirection channel 82 through which extends a stiffener 81 intended to reinforce its structure. Optionally, this stiffener 81 can be oriented so as to contribute to the orientation of the flow E7 passing through this redirection channel.

In other words, the redirection channel 82 is in this example divided into two compartments.

With reference to FIG. 8, the redirection channel 82 is delimited by two walls 83 and 84 of the deflector 60 and has an inlet 85 and an outlet 86.

The walls 83 and 84 are curved so as to direct the flow E7 in the upstream direction when the door 47 is in the open position.

Figure 10:
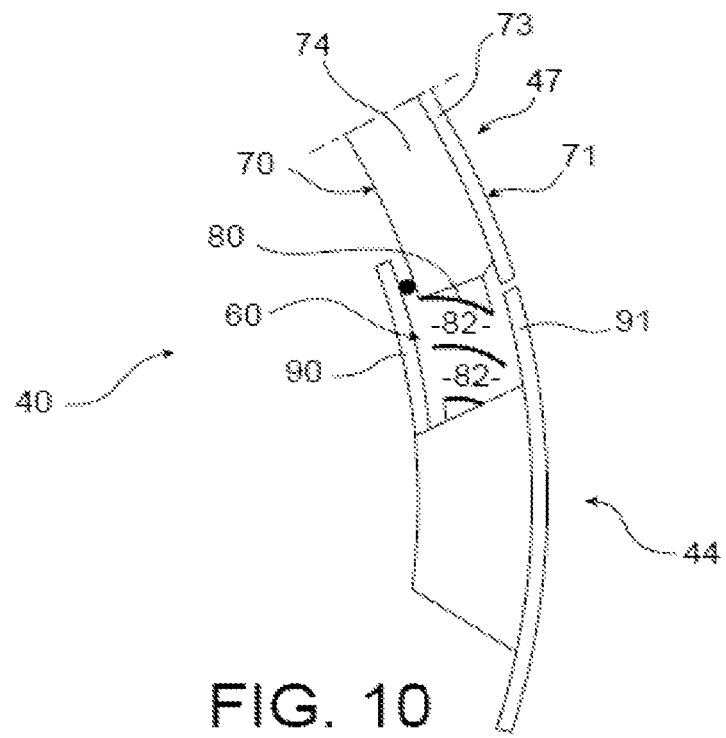
FIG. 10 is a schematic sectional view of a reverser having a door provided with a deflector according to a second embodiment of the invention, the reverser being in the direct thrust configuration.

In the embodiment of FIG. 10, deflector 60 comprises two redirection channels 82.

In an embodiment not shown, each of the redirection channels comprises one or more reinforcing elements such as the stiffener 81 shown in FIG. 7.

In each of these embodiments, the deflector 60 extends radially between an internal surface 70 and an external surface 71 of the door 47 (see FIGS. 8 to 10).

With reference to FIGS. 9 and 10, when the door 47 is in the closed position, the deflector 60 is received in a circumferentially delimited housing between one of the beams 44 and a core 74 of the door 47. This beam 44 is called internal beam given its positioning vis-à-vis the internal lateral end 54 and as a result of its relative position with respect to the vertical median longitudinal plane and to the fuselage 2.

Radially, this housing is delimited:
in the example of FIG. 10, by internal 90 and external 91 walls of the internal beam 44;
in the example of FIG. 9, on the one hand by the internal wall 90 of the internal beam 44 and, on the other hand, partly by the external wall 91 of the internal beam 44 and partly by an external wall 73 of the door 47.

In each of these examples, when the door 47 is in the closed position, the redirection channel(s) 82 are closed off at the inlet by the internal wall 90 of the internal beam 44 and at the outlet by the external wall 91 of the internal beam 44.

The deflector 60 of FIGS. 7 to 10 is a separate part of the door 47 and is fixed thereto, for example by welding or riveting.

In an embodiment not shown, the redirection channel(s) 82 are recesses made in the door 47.

In the example of FIG. 7, the deflector 60 is positioned at a distal end of the flank 80 of the door 47 and, independently, has a longitudinal dimension X1 greater than half the length X2 of the emerged portion of the flank 80 of the door 47 (see also FIG. 5).

Good performance can be obtained with a dimension X1 greater than or equal to 25% of the dimension X2.

Regarding the orientation of the flow E7, the deflector 60 is preferably configured to redirect at least a portion of the fluid E7 passing through the redirection channel(s) 82 in a direction A8 (see FIG. 11).

In this example, the direction A8 and the central longitudinal axis A7 of the reverser 40 form, in a median horizontal plane passing through this axis A7, an angle B2 such that the axial component of the flow E7 is greater than its lateral component.

In this example, the angle B2 is comprised between 15° and 25°.

In the embodiments described above, the reverser 40 comprises a single deflector 60 integral with the upper door 47 and located on the same side as the fuselage 2 of the aircraft 1 with respect to said vertical median longitudinal plane P1 of this reverser 40.

In another embodiment not shown, the lower door 46 of the reverser 40 comprises a second deflector of the same type, on the same side as the deflector 60 of the upper door 47 with respect to this vertical plane.

Figure 12:
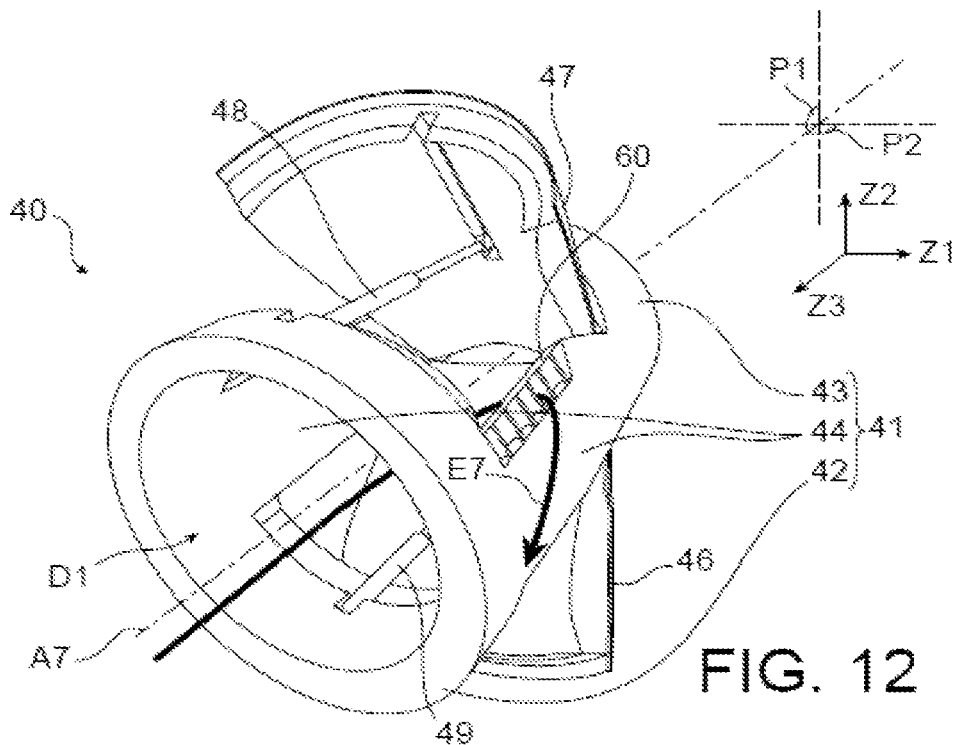
FIG. 12 is a schematic perspective view of a thrust reverser according to the invention in thrust reversal configuration, this reverser comprising a deflector integral with the fixed structure of the reverser.

FIG. 12 shows another embodiment wherein the deflector 60 is integral with the fixed structure 44. What has just been described with reference to FIGS. 7 to 11 applies by analogy to the embodiment of FIG. 12.

In the example of FIG. 12, the deflector 60 comprises a cascade having curved vanes which delimit several longitudinally succeeding fluid redirection channels.

The cascade 60 is in this example a separate part of the internal beam 44 and is fixed to the latter, for example by welding or riveting.

More specifically, the cascade 60 extends in a longitudinal direction and comprises a succession of vanes along this direction. For each pair of adjacent vanes, the latter delimit therebetween one of the redirection channels, each redirection channel comprising an inlet located radially inside relative to the internal beam and an outlet located radially outside relative to this internal beam.

In one embodiment, the vanes of the cascade 60 are movable and their orientation is controlled by an actuator (not shown) configured to modify an exit direction of the fluid passing through the redirection channels according to external conditions (lateral wind, speed, etc.).

Of course, the deflector 60 of FIG. 12 may be different from that which has just been described. For example, in an embodiment not shown, the deflector 60 comprises a single redirection channel.

In another embodiment not shown, the redirection channel(s) are recesses made in the internal beam 44.

Such a cascade deflector 60 can alternatively or additionally be disposed on the door 47.

The invention is in no way limited to reversers of the type described above. For example, the invention applies similarly to a reverser such as that described in document FR 2 764 000 A1.

The invention also applies to reversers comprising more than two doors, for example to reversers intended to reverse only the secondary flow of a propulsion assembly.

More generally, the principle of the invention can be implemented in any application requiring improved control of the air jets exiting the reverser in reverse thrust. For example, the invention is also of interest in applications wherein the reverser equips a propulsion assembly mounted under an aircraft wing.

The invention claimed is:

1. A thrust reverser for an aircraft propulsion assembly, said thrust reverser comprising:
    a fixed structure; and
    a door movable between:
        a closed position wherein the door delimits with the fixed structure a flow conduit, the flow conduit comprising an ejection outlet delimited at least partly by a rear end of the fixed structure, the door in the closed position being configured to be able to guide a fluid flowing in the conduit to the ejection outlet in order to generate a thrust, and
        an open position wherein the door releases a reversal opening so as to be able to evacuate from the flow conduit a portion of said fluid, via said reversal opening, and redirect a first portion of the fluid thus evacuated to a front end of the fixed structure in order to generate counter-thrust, the opening of the door forming a lateral opening extending between the fixed structure and a lateral end of the door,
    wherein said thrust reverser comprises only on one side of a first median longitudinal plane of the thrust reverser, one of the door and the fixed structure, or each of the door and the fixed structure, comprises a deflector configured to be able to redirect a second portion of the fluid forward of the fixed structure, said second portion of the fluid exiting the flow conduit along a trajectory oriented towards said lateral opening,
    wherein the deflector comprises one or more channels for redirecting said second portion of the fluid,
    wherein the deflector extends radially between an inlet of said one or more channels on an internal surface of the door and an outlet of said one or more channels on an external surface of the door, at least when the door is closed,
    wherein the internal surface of the door defines the flow conduit when the door is in the closed position, and the external surface of the thrust door is an external surface of the reverser in the closed position, and
    wherein the deflector is configured so that the inlet of the one of more channels is closed off by the fixed structure when the door is closed.

2. The thrust reverser according to claim 1, wherein said deflector comprising one or more recesses forming said one or more channels.

3. The thrust reverser according to claim 1, wherein the deflector is an insert.

4. The thrust reverser according to claim 1, wherein the deflector is configured to redirect said second portion of the fluid so that, at the outlet of the deflector, at least a fraction of the fluid thus redirected is oriented in a direction forming with a central longitudinal axis of the thrust reverser, in a median horizontal plane passing through said central longitudinal axis, an angle comprised between 15° and 75°, when the door is in the open position.

5. A nacelle for an aircraft propulsion assembly, said nacelle comprising a thrust reverser according to claim 1.

6. An aircraft comprising a fuselage and an aircraft propulsion assembly, the aircraft propulsion assembly comprising the nacelle according to claim 5 and being mounted on the fuselage, the deflector and the fuselage being located on the same side of said first median longitudinal plane of the thrust reverser.

7. The aircraft according to claim 6, said aircraft comprising a tail, said tail and said door of the thrust reverser being located on the same side of a second median longitudinal plane of the thrust reverser, said second median longitudinal plane being perpendicular to said first median longitudinal plane.

* * * * *